United States Patent [19]

Kovacs et al.

[11] 3,994,863

[45] Nov. 30, 1976

[54] PROCESS FOR THE MANUFACTURE OF POLYESTER IMIDES USING MELAMINE AS THE POLYAMINE REACTANT

[75] Inventors: Jenoe Kovacs, Bobenheim-Roxheim; Matthias Marx, Bad Duerkheim; Hans Jung, Ludwigshafen, all of Germany

[73] Assignee: BASF Aktiengesellschaft, Ludwigshafen (Rhine), Germany

[22] Filed: Mar. 5, 1975

[21] Appl. No.: 555,407

[30] Foreign Application Priority Data

Mar. 15, 1974 Germany............................ 2412471
Mar. 15, 1974 Germany............................ 2412470

[52] U.S. Cl................................. 260/75 N; 260/77
[51] Int. Cl.².......................................... C08G 69/44
[58] Field of Search............................. 260/75 N, 77

[56] References Cited
UNITED STATES PATENTS

| | | | |
|---|---|---|---|
| 3,382,203 | 5/1968 | Rating et al. | 260/75 N |
| 3,426,098 | 2/1969 | Meyer et al. | 260/75 N |
| 3,817,943 | 6/1974 | Lee et al. | 260/75 N |
| 3,865,785 | 2/1975 | Pauze | 260/75 N |

*Primary Examiner*—Eugene C. Rzucidlo
*Attorney, Agent, or Firm*—Johnston, Keil, Thompson & Shurtleff

[57] ABSTRACT

Process for the manufacture of polyester imides. Melamine, an at least tribasic carboxylic acid, a polyhydric alcohol and, optionally, an aromatic dicarboxylic acid are condensed at elevated temperature. The polyester imides are suitable, in the form of solutions, aqueous dispersions or melts, for use as baking enamels for metallic conductors.

4 Claims, No Drawings

PROCESS FOR THE MANUFACTURE OF POLYESTER IMIDES USING MELAMINE AS THE POLYAMINE REACTANT

This invention relates to a process for the manufacture of novel improved polyester imides based on melamine, polybasic carboxylic acids and polyhydric alcohols and to their use as electrical insulating materials.

German published applications Nos. 1,209,684 and 1,445,263 and German patent applications Nos. P 1 495 100.9, P 1 495 129.2, P 1 495 152.1, P 1 495 174 and P 1 495 182.7 disclose the manufacture of condensates using monomers containing cyclic imide groups or compounds which lead to the formation of cyclic imide groups during condensation. Such polyester imides are usually reaction products of two moles of a cyclic anhydride of a polybasic aromatic carboxylic acid and one mole of a diamine. Such diimide dicarboxylic acids are reacted with polyhydric alcohols such as ethylene glycol and/or glycerol or pentaerythritol in the presence of polybasic carboxylic acids or their alkyl esters, e.g. dimethyl terephthalate or isophthalate.

The heat resistance and flexing resistance of these polyester imides, however, are not always sufficient for some applications, for example when used as wire enamels. The German published application No. 1,645,435 proposes the use of tris-(2-hydroxyethyl)-isocyanurate or mixtures thereof with polyhydric alcohols as a crosslinking component. However, the breakdown temperature, elasticity and surface gloss and hardness are not always satisfactory when these products are used for some electrical insulating purposes.

The reaction of benzoguanamine with trimellitic anhydride is also known, but this leads to dicarboxylic diimides which are not suitable for the manufacture of crosslinked and thus sufficiently heat-resistant polymers.

It is an object of the present invention to provide novel highly heat-resistant polyester imides for wire coatings having good mechanical and thermal properties, particularly excellent hardness and torsion values and good heat shock resistance and thermal resistance under pressure, and also to provide a process for the manufacture thereof. Surprisingly, such industrially advantageous polyester imides are obtained by reacting melamine with polybasic carboxylic acids or derivatives thereof and with polyhydric alcohols at elevated temperatures.

The present invention relates to a process for the manufacture of polyester imides, wherein
A. melamine is reacted with
B. at least one carboxylic acid which is at least tribasic and/or its anhydride, acid chloride or esters thereof with lower monoalkanols,
C. at least one polyhydric alcohol and, optionally,
D. one or more aromatic dicarboxylic acids or esters thereof with lower monoalkanols, provided that the molar ratio of component (A) : (B) is from 1:1.1 to 1:3, in the presence of catalysts and in the presence or absence of polar organic solvents at temperatures of from 150° to 295° C.

In particularly advantageous embodiments of the process of the invention, the component (B) is trimellitic anhydride, the component (D) is present in an equivalent amount of up to 85% based on the esterifiable hydroxyl group of the component (C) to be condensed into the polyester imide precondensate of (A), (B), (C) and (D), and the catalyst used is an esterifying catalyst in an amount of 0.2 to 4%, based on the polyester imide precondensate.

The present invention also relates to the use of the polyester imide prepared according to the above process as baking enamels for electric conductors.

The following comments relate to the individual components to be used in the process of the invention.

A. Melamine is used in an amount of from 5 to 15% w/w and preferably from 8 to 13% w/w, based on the total weight of polyester imide precondensate (A) to (D). However, melamine may be replaced, if desired, by other compounds containing amino groups, for example 1,3,5-triaminobenzene or 4,4-diaminodiphenylmethane, in amounts of up to 50% molar. We prefer, however, to use melamine alone as component (A).

B. Suitable at least tribasic carboxylic acids and/or anhydrides, acid chlorides or esters thereof with lower monoalkanols are aliphatic, cycloalipahtic and, preferably, aromatic polycarboxylic acids of up to 6 carboxyl groups and derivatives thereof, particularly derivatives containing two or more vicinal carboxyl groups. Examples of such suitable compounds are pyromellitic anhydride, m-benzophenonetrioic anhydride, trimellitic acid, trimellitic chloride, trimellitic mono-, di- and tri-esters of monoalkanols containing from 1 to 4 carbon atoms, preferably trimellitic anhydride. Mixtures of these compounds are also suitable.

The molar ratio of component (A) : (B) in the polyester imides of the invention is from 1:1.1 to 1:3 and preferably from 1:2 to 1:3.

C. Suitable polyhydric alcohols are diols containing from 2 to 4 carbon atoms, such as ethylene glycol, propylene glycol, butanediol, diols containing ether groupings such as diglycol, triglycol, triols such as glycerol, trishydroxyethyl isocyanurate and trimethylol propane and higher alcohols such as pentaerythritol and mixtures of said polyhydric alcohols. Component (C) is generally used in amounts of from 10 to 25% and preferably from 15 to 20%, by weight of the total weight of components (A) + (B).

D. Suitable aromatic dicarboxylic acids are, for example, terephthalic acid, isophthalic acid, dicarboxylic acids of polynuclear aromatics, such as 4,4'-diphenylester dioic acid and aromatic dicarboxylic acids containing —CO— or S—, SO—, $SO_2$— and $CH_2$— groups, for example benzophenone dioic acid, diphenylsulfone dioic acid, diphenylsulfide dioic acid, diphenylsulfoxide dioic acid and diphenylmethane dioic acid and mixtures thereof. These aromatic dicarboxylic acids may, if desired, be used in the form of their derivatives, particularly their esters, in the process of the invention. Component (D) is used in amounts of up to 85 and preferably from 5 to 55 equivalent per cent, based on the esterifiable hydroxyl groups in the component (C) to be condensed into the polyester imide precondensate of (A), (B), (C) and (D) in the present process.

Suitable polar solvents which may be used in the process of the invention are for example phenols such as cresol, xylenol, amides, such as N-methylpyrrolidone, hexamethylphosphoramide and diols or oxaalkene diols such as glycol, diglycol, triglycol, as given under (C) above. The solvents are usually used in amounts of from 10 to 50% by weight, based on the polyester imide precondensate.

Surprisingly, it is possible to condense melamine, which is relatively slow to react as compared with the reation with acids or acid derivatives, with up to 3 moles of trimellitic anhydride with the elimination of water.

The reaction of components (A) to (D) with each other is effected at temperatures of from 150° to 295° C and preferably from 180° to 260° C, the reactants being added in various orders.

For example, the preparation of the precondensates of melamine (A) and polybasic carboxylic acids or carboxylic anhydrides (B) may be carried out in polar solvents such as xylenol, glycol, diglycol, triglycol, N-methylpyrrolidone, cresol or hexamethylphosphoramide at temperatures above 200° C to eliminate from 1 to 3 moles of water depending on the molar ratio of the starting materials.

Conversion of the melamine-carboxylic acid precondensate to polyester imide may then be carried out by reaction with polyhydric alcohols such as ethylene glycol, diglycol, triglycol, butanediol, glycerol, pentaerythritol, trishydroxyethyl isocyanurate or mixtures thereof at temperatures above 150° C using catalysts such as titanyl compounds, titanates or metal acetates. To control crosslinking, it is advantageous to include dicarboxylic acids such as isophthalic acid and/or terephthalic acid and/or benzophenone dioic acid (D) or esters thereof. Alternatively, the starting materials, i.e. melamine, trimellitic anhydride, glycol and terephthalic or isophthalic acid may be stirred together and then maintained at an elevated temperature with the addition of catalysts such as antimony acetate until a clear melt is produced. The viscosity or melting point may be controlled by cooling the melt at a given time.

The polyester imides produced according to the invention show considerable advantages over both the polyester imides described in German published application No. 1,445,203 and the products prepared with trishydroxyethyl isocyanurate (German published application No. 1,645,435). Whereas the above polyester imides produce wire coatings having a pencil hardness of not more than 4 H and a thermal resistance under pressure of 312° C and a heat shock value of 200° C, the coatings obtained with the polyester imides of the present invention have pencil hardnesses of up to 6 H, softening points of up to 400° C and a heat shock resistance of up to 220° C. Furthermore, coatings prepared with the products of the invention have torsion values of up to 220 and peel test values of up to 400 (according to DIN 46,453) and the external fiber expansion is up to more than 84%. These properties may be varied within wide limits by varying the type of catalyst added and the baking conditions. Examples of suitable catalysts are titanates, such as butyl titanate, triethylammonium titanate or oxotitanium compounds such as oxotitanium oxalates, citrates, lactates or metal acetates such as antimony acetate, cadmium acetate and zinc acetate.

The use of the novel polyester imides as baking enamels for electric conductors, particularly wire enamels, is effected in known manner. For example, the molten polymer is dissolved in solvents such as cresols, xylenols, N-methylpyrrolidone or dimethylformamide, and catalyst is added to the solution. The viscosity of the solution may be adjusted to suit the desired processing conditions either by varying the concentration or by using solvent mixtures. Alternatively, the polyester imide precondensates of the invention may be melted in heated baths, to which catalyst is then added. Coating is then effected from the melt. In such melt coating, the desired thickness of the coating may be quickly obtained in a few as 2 or 3 passes.

Another alternative is to use the novel polyester imides in the form of aqueous dispersions. Such dispersions are distinguished by good stability on storage and are also environmentally acceptable due to the fact that application thereof involves no removal of solvent. The aqueous dispersions contain the polyester imide precondensate in the form of fine particles having diameters of less than 5 $\mu$m, preferably less than 1.5$\mu$m, generally in an amount of from 20 to 60% and preferably from 25 to 50%, by weight. In order to ensure good flow properties of the condensates on application, it is advantageous to add from 0.5 to 8%, preferably from 1 to 6%, by weight, based on the dispersion, of flow promoting agents.

Preparation of the dispersion may be carried out by a number of methods. For example, the melt may be precomminuted by means of a flocculating roller or by spraying in a spray tower and then ground down to the desired particle sizes of about 100 $\mu$m in mechanical mills such as baffle plate impact mills and pinned disc mills. The dispersions are then prepared from the polyester imide powders obtained by said dry milling processes by further grinding, preferably in the presence of water. Such combined dry and wet milling of the molten precondensates is generally preferred for the manufacture of dispersions of the invention in which the particle diameters are less than 3 $\mu$m and in particular less than 1.5 $\mu$m.

Wet grinding is effected in mechanical dispersing equipment, for example ball mills and preferably in dispersing machines containing grinding elements of high local energy density, for example stirred ball mills, sand mills, netzsch mills, dyno mills, planetary ball mills, stirred ball mills and attritors. Preferred grinding media are spherical elements of, say, glass, ceramics, porcelain, quartz or hard attrition-resistant plastic material (e.g. polyamide, copolymers of styrene and maleic anhydride), the particle diameter of such media being from 0.2 to 8 mm and preferably from 0.4 to 5 mm. The duration of milling is from 2 to 16 hours depending on the mill used and is more than 24 hours in the case of ball mills. There are obtained dispersions having solid contents of from 20 to 60% and particles having a diameter of less than 5 $\mu$m and preferably less than 1.5 $\mu$m.

Another suitable process for the manufacture of dispersions of the invention starts from a solution of the polyester imide precondensate in tetrahydrofuran or dioxane, optionally containing polycondensation catalysts, which solution is precipitated in water containing emulsifier and/or protective colloid. The solvent is evaporated under reduced pressure. There are obtained dispersions in which the particle sizes are less than 5 $\mu$m. Further comminution may be carried out using the above mentioned dispersing mills.

Suitable flow promoting agents are for example glycols, butylglycol, N-methylpyrrolidone, diphenyl and polymers of vinylpyrrolidone and/or copolymers of acrylonitrile and acrylic acid and/or of vinylpyrrolidone and vinyl propionate, the preferred agents being butylglycol and the said copolymers. The flow promoters may be added to the dispersions in amounts of from 0.5 to 8% and preferably from 1 to 6% by weight, based on the weight of polyester imide precondensate.

The pH of the dispersions may, if necessary, be adjusted to from 8 to 9 with amines such as ethanolamine and triethanolamine.

In the following Examples the parts and percentages are by weight.

EXAMPLE 1

248 parts of dimethyl terephthalate and 157 parts of glycol were mixed and heated to 100° C. At this temperature, 0.4 part of manganese acetate was added and the temperature was raised to 140° C over 2 hours. A homogeneous solution was obtained which was then cooled to 100° C and 161.2 parts of melamine and 742.0 parts of trimellitic anhydride were added. The mixture was then heated to 245° C at a rate of about 30 minutes per 10° C. Water and glycol were distilled off. There was obtained a clear melt. The melting point of a sample was 98° to 100° C and the viscosity was 24 centistokes (at 20° C) in a 33% solution in N-Methylpyrrolidone. The melt solidified on cooling.

The melt described in Example 1 above was used to prepare a 40% solution in N-methylpyrrolidone, which was then used for coating a 1 mm thick copper wire at 500° C. The resulting insulation showed the following properties:

| | |
|---|---|
| Pencil hardness | 5 to 6 H |
| pencil hardness after storage for 1 hour in benzene in 60° C | 5H |
| Peel test according to IEC 251-1 | 198 to 205 |
| heat shock test (wire wound round double the diameter of the coated wire, followed by tempering for 1 hour at 220° C) | satisfactory |
| external fiber expansion (wire wound round the diameter of the coated wire after 20% prestretching) | 84% |

EXAMPLE 2

77.6 parts of dimethyl isophthalate, 172.0 parts of glycol and 0.4 part of zinc naphthenate were heated at 140° C to give a homogenous solution. There were then added to the solution, at 100° C, 201.6 parts of melamine, 921.6 parts of trimellitic anhydride and 650 parts of glycol. The mixture was heated to 240° C over 8 hours. A homogeneous clear melt was produced in the vessel, and this was then cooled to room temperature. 400 parts of the melt were then dissolved in 600 parts of cresol and 8 parts of butyl titanate were added to the solution. Copper wires were coated with this solution in 8 passes through a baking oven (length 3.5 m) at 510° C. The resulting coating had a pencil hardness of 6 H. It satisfactorily passed the heat shock test after prestretching by 10% and storage for 1 hour at 200° C. The softening point of the coating was 375° C, as measured according to DIN 46,453.

EXAMPLE 3

A polyester imide melt as described in Example 1 was mixed with 10 parts of triethylammonium titanate and the temperature of the melt was adjusted to 200° C. A 1 mm thick copper wire was then coated with the melt. The thickness of the coating was 52 μm after 3 passes. The coating had the same properties as given in Example 1.

EXAMPLE 4

155.2 parts of dimethyl terephthalate and 161.2 parts of glycol were heated to 100° C and 0.4 part of manganese(II) acetate were added thereto. The temperature was then raised to 150° C. There was obtained a homogeneous solution to which, at 100° C, 151.2 parts of melamine, 691.2 parts of trimellitic anhydride and 650 parts of glycol were added, whereupon the temperature was raised to 160° C. About 110 parts of distillate were obtained at this temperature over 2 hours. The temperature was then raised to 240° C at a rate of 60 minutes per 10° C, to give a clear melt. The melting point of the product was 175° to 180° C. The melt was poured into a porcelain dish and cooled to 20° C and then comminuted (standard size less than 1 mm). This powder was then milled in a baffle plate impact mill to a fineness of less than 60 μ and then dispersed in water in this form (58 parts of water, 40 parts of powder, 2 parts of triethanolamine titanate) and the dispersion was milled in a stirred ball mill for 6 hours.

There was obtained a homogeneous dispersion in which the particle size of 90% of the particles was less then 1.5 μ. 1 mm thick copper wires were coated to a thickness of 50 μ with this dispersion at 500° C in a conventional baking oven (length 3.5 m) at a rate of 5 to 10 m/min. Such coatings showed softening points of up to 380° C, heat shock resistance at 220° C (according to DIN 46,453) and an external fiber stretch of more than 80%. The pencil hardness was 5 to 6 H.

We claim:
1. A process for the manufacture of polyester imides wherein
   A. melamine is reacted with
   B. at least one carboxylic acid which is at least tribasic and/or its anhydride, acid chloride or esters thereof with lower monoalkanols,
   C. at least one polyhydric alcohol and, optionally,
   D. one or more aromatic dicarboxylic acids or esters thereof with lower monoalkanols, provided that the molar ratio of component (A) : (B) is from 1:1.1 to 1:3, in the presence of catalysts and in the presence or absence of polar organic solvents at temperatures of from 150° to 295° C.

2. A process as claimed in claim 1, wherein component (B) is trimellitic anhydride.

3. A process as claimed in claim 1, wherein the component (D) is used in an amount of up to 85 equivalent percent, based on the esterifiable hydroxyl groups of the component (C) to be condensed into the polyester imide precondensate of (A), (B), (C) and (D).

4. A process as claimed in claim 1, wherein the catalyst used is an esterification catalyst in an amount of from 0.2 to 4%, based on the polyester imide precondensate.

* * * * *